(12) United States Patent
Vandaele

(10) Patent No.: US 7,745,568 B2
(45) Date of Patent: Jun. 29, 2010

(54) TRANSFER VESSEL BETWEEN FLASH TANK AND PURGE COLUMN

(75) Inventor: Hugo Vandaele, Sint-Andries (BE)

(73) Assignee: Total Petrochemicals Research Feluy, Feluy (BE)

( * ) Notice: Subject to any disclaimer, the term of this patent is extended or adjusted under 35 U.S.C. 154(b) by 313 days.

(21) Appl. No.: 10/589,203

(22) PCT Filed: Feb. 8, 2005

(86) PCT No.: PCT/EP2005/050526

§ 371 (c)(1),
(2), (4) Date: May 11, 2007

(87) PCT Pub. No.: WO2005/080446

PCT Pub. Date: Sep. 1, 2005

(65) Prior Publication Data

US 2008/0058481 A1 Mar. 6, 2008

(30) Foreign Application Priority Data

Feb. 13, 2004 (EP) .................................. 04100592

(51) Int. Cl.
*B01J 19/18* (2006.01)
*C08G 64/00* (2006.01)

(52) U.S. Cl. ............................ 528/501; 34/259; 34/368; 34/403; 34/500; 422/132; 422/255; 502/113; 502/117; 502/120; 528/498; 528/500

(58) Field of Classification Search ................... 34/259, 34/368, 403, 500; 422/132, 255; 502/113, 502/117, 120; 528/498, 500
See application file for complete search history.

(56) References Cited

U.S. PATENT DOCUMENTS

| 3,152,872 | A | * | 10/1964 | Salmon et al. ................. 34/407 |
| 6,319,997 | B1 | * | 11/2001 | Kendrick et al. .............. 526/64 |
| 6,566,460 | B1 | * | 5/2003 | Salmon ........................ 526/64 |
| 2005/0272891 | A1 | * | 12/2005 | Fouarge et al. ............... 526/943 |
| 2007/0032611 | A1 | * | 2/2007 | Vandaele ...................... 526/64 |
| 2007/0036693 | A1 | * | 2/2007 | Vandaele ...................... 422/131 |
| 2009/0143546 | A1 | * | 6/2009 | Fouarge et al. ................. 526/64 |

FOREIGN PATENT DOCUMENTS

EP 0 415 427 * 3/1991

* cited by examiner

*Primary Examiner*—Terressa M Boykin
(74) *Attorney, Agent, or Firm*—Tenley R. Krueger

(57) ABSTRACT

A process is provided for recovering polymer solids from a polymerisation reactor effluent. The process comprises extracting the polymerisation effluent from a polymerisation reactor; passing the effluent, or a part thereof, to a flash vessel for flashing liquid in the effluent to vapour, and removing said vapour from said flash vessel; passing the polymer solids from the flash vessel to a transfer apparatus which comprises a transfer vessel; passing the polymer solids from the transfer vessel to a purging means for removing residual liquid from the polymer solids; wherein the polymer solids are passed from the flash vessel to the purging means in a continuous flow such that a quantity of polymer solids is maintained in the transfer vessel. An apparatus for performing the process is also provided.

7 Claims, 4 Drawing Sheets

TRANSFER VESSEL BETWEEN FLASH TANK AND PURGE COLUMN

The present invention concerns an improved process for recovering polymer solids from a polymerisation reactor effluent, and to an apparatus thereof.

During the polymerisation process for the production of solid polymers, a polymer effluent is normally formed. The polymerisation reactor effluent comprises a slurry of polymer solids in a liquid medium. The liquid medium typically comprises the reaction diluent, and unreacted monomer. The reaction diluent is typically an inert hydrocarbon solvent. The diluent may be the monomer used in the polymerisation process, and in such cases, the polymerisation reactor effluent will comprise a substantial quantity of unreacted monomer. Where the polymer is formed from copolymerisation of a monomer with one or more comonomers, the liquid medium will comprise both unreacted monomer and unreacted comonomer.

In order to recover polymer solids from the polymerisation reactor effluent, it is necessary to separate the polymer solids from the remainder of the effluent. It is clearly desirable to remove as much of the effluent from the polymer solids as possible since this will enhance the purity of the isolated polymer solids. Furthermore, it is also desirable to recover the diluent, monomer and comonomer from the reaction effluent so that they can be recycled to the polymerisation reactor. Continuing concerns in such recovery are power requirements and cost.

Processes are known for recovering diluent, monomer or comonomer from the reaction effluent. Such processes generally employ a flash process in which the diluent (and preferably monomer and, when present, comomer) are removed from the effluent. The flash process is generally either a one-stage flash process or a two-stage flash process. The effluent is typically discharged to a flash vessel wherein the mixture is flashed to a low pressure. The resulting vapour is then typically treated in a distillation section to allow separate recovery of diluent, monomer and comonomer. In a two-stage flash process, the polymer is typically heated after, for example, being collected in one or more settling legs. Following the first flash step, the polymer solids are then subjected to a lower pressure flash step.

Following the flashing process, the polymer solids, together with any hydrocarbon vapour which may be between the polymer solids, and any small amounts of liquid hydrocarbon not flashed to vapour, are passed to a purge column, typically a nitrogen purge column. A conveyer drying unit may be employed before the purge column in some instances. The purpose of the purge column is to strip liquid hydrocarbon trapped in the pores of the polymer. Nitrogen gas is typically fed into the bottom of the purge column and the hydrocarbon vapour is removed from the column.

Following the purging step, the polymer solids can be packaged, either in powder form, or in an extruded pellet form.

A particular problem associated with recovering polymer solids from a polymerisation reactor effluent arises from the transfer of nitrogen and/or hydrocarbon vapours between the purge column and the flash tank. In this regard, cross-contamination of hydrocarbons between the purge column and the flash tank is undesirable since this necessitates the further separation of the hydrocarbons, which is both difficult and costly. Furthermore, contamination of hydrocarbon vapour in the flash tank with nitrogen is undesirable for the same reason. However, contamination of hydrocarbons with nitrogen is particularly problematic because of the non-condensable nature of nitrogen, thus further rendering the subsequent separation of vapour products even more difficult and costly.

In order to reduce the transfer of nitrogen and/or hydrocarbon vapours between the purge column and the flash tank, a two-valve system has been employed comprising two rotary valves which are connected in series between the flash tank and the purge column. The first of these valves is adjacent to the flash tank and the second of these valves is adjacent to the purge column. These valves are typically operated by a sequencing controller to alternately open and close the valves. In this way, the first valve is opened for a predetermined period of time while the second valve remains closed, during which time a portion of the line between the valves fills with polymer solids in the flash tank. The first valve is then closed and the second valve opened to allow the passage of polymer solids through the second valve and into the purge column.

Whilst this prior method has achieved some success in preventing the transfer of nitrogen and/or hydrocarbon vapours between the purge column and the flash tank, it has several disadvantages.

The method is time consuming since it relies on the sequential transfer of polymer solids from the flash tank to the purge column which itself relies on the timely opening and closing of the first and second valves. In this connection, the transfer of polymer solids from the flash tank to the purge column is inherently limited by the need to constantly open and close the first and second valves.

It has also proven difficult to have tight (or secure) valves rotating in powder. Accordingly, in order to ensure an effective reduction of transfer of nitrogen and/or hydrocarbon vapours, it has often been necessary to employ a greater number of valves, for example two valves in series proximal to the flash tank and two valves in series proximal to the purge column.

It is an aim of the present invention to solve the problems with the known methods described above. Thus, the present invention seeks to provide an improved process and apparatus for recovering polymer solids from a polymerisation reactor effluent.

LIST OF FIGURES

Accordingly, the present invention discloses an apparatus for recovering polymer solids from a polymerisation effluent that comprises:

a) a flash vessel (1) for flashing liquid in the effluent or a part thereof to vapour;

b) a purge vessel (11) for removing residual liquid from the polymer solids;

characterised in that, a transfer vessel (6) is introduced between the flash vessel and the purge vessel.

The flash vessel may be a single-stage or a multiple-stage flash vessel.

In this invention, the two-valve system between the flash tank and the purge column, generally used in prior art and comprising two rotary valves connected in series and sequentially operated in order to prevent nitrogen and hydrocarbon vapours contained in the purge vessel to enter the flash tank, has been replaced by a system comprising a transfer vessel between two valves. The present system thus no longer necessitates the careful control of the two valves to prevent transfer of nitrogen and hydrocarbonvapours to the flash tank as the transfer vessel operates as a seal. The system can thus be continuously operated.

The apparatus further comprises valve means, measuring means, processing means and control means.

Figure 1:
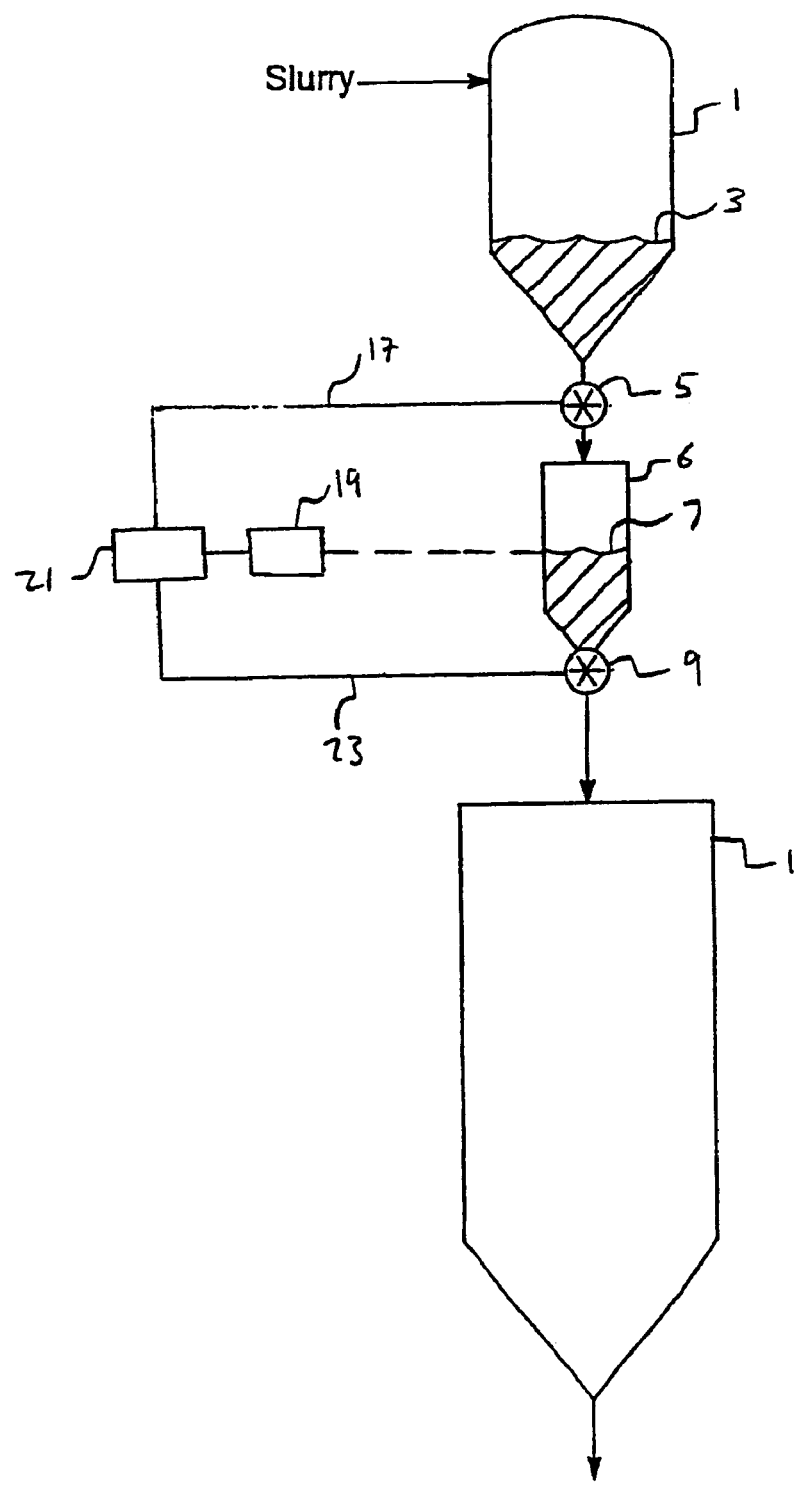
FIG. 1 shows an apparatus for recovering polymer solids form a polymerisation effluent according to the first embodiment of the present invention.

In a first embodiment according to the present represented in FIG. 1, the apparatus comprises:

a) a flash vessel (1) for flashing liquid in the effluent or a part thereof to vapour;

b) a first valve means (5) connecting the flash vessel (1) to the transfer vessel (6);

c) a transfer vessel (6) located between the flash vessel (1) and the purge vessel (11);

d) a second valve means (9) connecting the transfer vessel (6) to the purge vessel (11);

e) a purge vessel (11) for removing residual liquid from the polymer solids;

f) a measuring means (19) for measuring the level (7) of polymer solids in the transfer vessel;

g) a processing means (21) for processing the level (7) read by measuring means (19), and for generating a feedback signal respectively to the first and second valve means (5) and (9);

h) a first control means (17) for controlling the rate of transfer of polymer solids passing through the first valve means (5);

i) a second control means (23) for controlling the rate of transfer of polymer solids passing through the second valve means (9).

Figure 2:
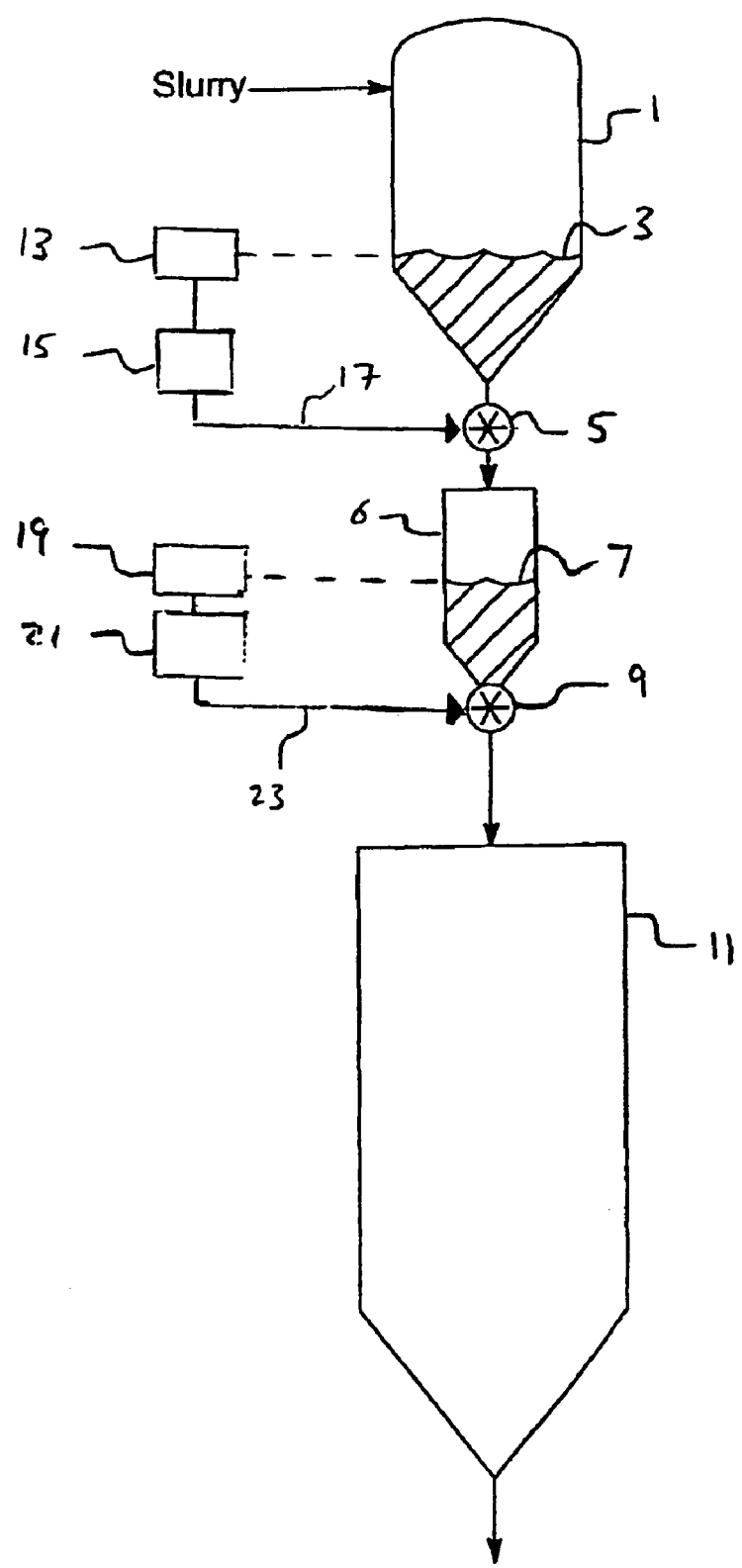
FIG. 2 shows an apparatus for recovering polymer solids form a polymerisation effluent according to the second embodiment of the present invention.

In a second embodiment according to the present invention represented in FIG. 2, the apparatus comprises features a) through e) of the first embodiment and additionally:

f') a first measuring means (13) for measuring the level (3) of polymer solids in the flash vessel (1)

g') a first processing means (15) for processing the level (3) measured in the flash vessel and for generating a feedback signal to control valve (5);

h') a first control means (17) for controlling the rate of transfer of polymer solids passing through the first valve means (5);

i') a second measuring means (19) for measuring the level (7) of polymer solids in the transfer vessel;

j') a second processing means (21) for processing the level (7) measured in the transfer vessel, and for generating a feedback signal to control valve means (9);

k') a second control means (23) for controlling the rate of transfer of polymer solids passing through the second valve means (9).

Figure 3:
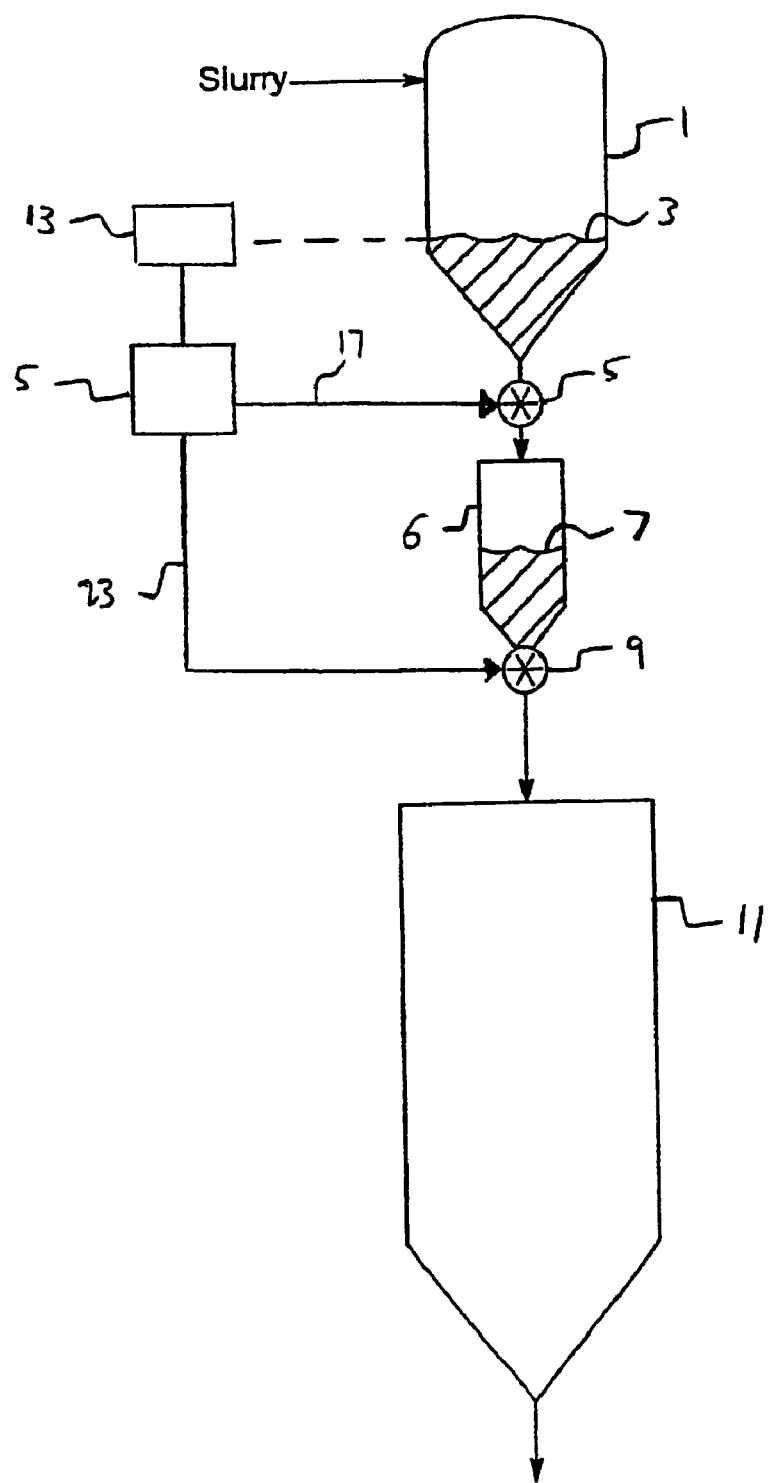
FIG. 3 shows an apparatus for recovering polymer solids form a polymerisation effluent according to the third embodiment of the present invention.

In a third embodiment according to the present invention represented in FIG. 3, the apparatus comprises features a) through e) of the first embodiment and additionally f") a measuring means (13) for measuring the level (3) of polymer solids in the flash vessel (1);

g") a processing means (15) for processing the level (3) measured in the flash vessel and for generating a feedback signal respectively to the first and second control valves (5) and (9);

h") a first control means (17) for controlling the rate of transfer of polymer solids passing through the first valve means (5);

i") a second control means (23) for controlling the rate of transfer of polymer solids passing through the second valve means (9).

The present invention also discloses a process for recovering polymer solids from a polymerisation effluent, which comprises the steps of:

(a) extracting the polymerisation effluent from a polymerisation reactor;

(b) passing the effluent, or a part thereof, to a flash vessel (1) for flashing liquid in the effluent to vapour, and removing said vapour from said flash vessel;

(c) passing the polymer solids to a purge vessel (11) for removing residual liquid from the polymer solids;

characterised in that, between the flash vessel and the purge vessel, the polymer solids are passed to a transfer vessel (6) wherein the level of polymer solids is maintained up to a pre-determined level (7); and wherein the layer of polymer solids present in the transfer vessel acts as seal isolating the flash vessel from the purge vessel.

The seal prevents the nitrogen used in the purge vessel to contaminate the flash vessel thereby removing the need to isolate the flash vessel by closing valves when nitrogen is sent up the flash tank.

Thus, in the present invention, a given polymer solid is transferred from the flash vessel to the purge means in a continuous flow, which contrasts with the previously-used sequential transfer method.

By maintaining a quantity of polymer solids in the transfer vessel is meant that a quantity of polymer solids remains in the transfer vessel during the transfer of polymer solids from the flash vessel to the purge means.

By ensuring that a level of polymer solids is maintained in the transfer vessel, the polymer solids themselves serve to reduce or inhibit the transfer of vapours such as nitrogen and hydrocarbon between the purge means and the flash vessel. Accordingly, the present invention has the advantage of utilising the efficiency of a continuous flow process, whilst reducing the transfer of gas and/or vapours between the purge column and the flash tank. As described above, reducing transfer of gas/vapours between the purge column and the flash tank is particularly advantageous since this reduces cross-contamination of hydrocarbons which would have to be separated. Furthermore, avoiding the contamination of hydrocarbon vapour in the flash vessel with gas from the purge column avoids the difficult and costly process of separating the gas from the contaminated hydrocarbons.

In the context of the present invention, "polymerisation effluent" means an extract from a polymerisation reactor The present invention will now be described in more detail by way of example only with reference to the following figure, in which:

In the first step of the method of the present invention, the polymerisation effluent is extracted from a polymerisation reactor. Preferably, the reactor is in the form of a loop reactor, wherein polymerisation is carried out in a circulating turbulent flow. A so-called loop reactor is well known and is described in the Encyclopaedia of Chemical Technology, 3$^{rd}$ edition, vol. 16, page 390. This can produce LLDPE (linear low density polyethylene) and HDPE (high density polyethylene) resins in the same type of equipment. The loop reactor may be connected in parallel or in series to one or more further reactors, such as another loop reactor, thereby forming a "double loop" reactor.

In the present invention, the polymerisation process carried out in a double loop reactor is a continuous process. A monomer polymerises in a liquid diluent optionally in the presence of comonomer, a catalyst and an activating agent. The slurry is maintained in circulation by an axial pump in a reactor consisting essentially of vertical jacketed pipe sections connected by trough elbows. The polymerisation heat is extracted by a water-cooling jacket. The reactor line includes two loop reactors that can be used in parallel or series. The approximate volume of the reactors may be about 100 m$^3$. Monomodal or bimodal grades are produced with the parallel or series configurations.

Polymerisation effluent is then taken out of the reactor. The effluent typically comprises a slurry of polymer solids, reaction diluent, and unreacted monomer (and, if used, unreacted comonomer). The diluent may be the monomer or comonomer used in the polymerisation process. The effluent is typically taken out of the reactor through settling legs and discontinuous discharge valves. Preferably, a small fraction of the total circulating flow is withdrawn.

The effluent is then subjected to a flash process. The flash process may be a one-stage flash process or a multi-stage flash process (typically, a two stage flash process). During each flash process, the effluent, or a part thereof, is passed into a flash vessel (typically, a tank) where the flashing process takes place. The resulting gas/vapour is then separated from the remaining polymer solids and liquid, and the gas/vapour is then typically treated in a distillation section to allow separate recovery of diluent, monomer and comonomer. These components can then be fed back into the polymerisation reactor. When a two-stage flash process is employed, the polymer solids and liquid from the first flash process are fed into a second flash vessel and the process repeated.

Following the flash process, the polymer solids are then passed through a purge column for removing residual liquid from the polymer solids. A conveyer drying unit may be employed before the purge column in some instances. The purge means is typically a nitrogen purge column through which nitrogen gas is fed.

In the present invention, the polymer solids are passed from the flash vessel to the purging means in a continuous flow such that a quantity of polymer solids is maintained in the transfer vessel. By ensuring that a quantity of polymer solids is maintained in the transfer vessel, the polymer solids themselves serve to reduce or inhibit the transfer of gas/vapours such as nitrogen and hydrocarbon between the purge column and the flash tank.

In a preferred embodiment of the present invention, the transfer apparatus comprises a first valve means connecting the transfer vessel to the flash vessel, and a second valve means connecting the transfer vessel to the purge means, wherein the rate of transfer of polymer solids passing through the first valve means and the rate of transfer of polymer solids passing through the second valve means are controlled to maintain a quantity of polymer solids in the transfer vessel.

Preferably each valve means is controllable such that the rate of transfer of polymer solids through the valve means can be adjusted to a desired rate. The type of valve means is not particularly limited.

Preferably, the valve means are in the form of rotary valves. In this regard, the rate of transfer of polymer solids through the rotary valves can be adjusted by altering the rotation rate of the rotary valves.

Figure 4:
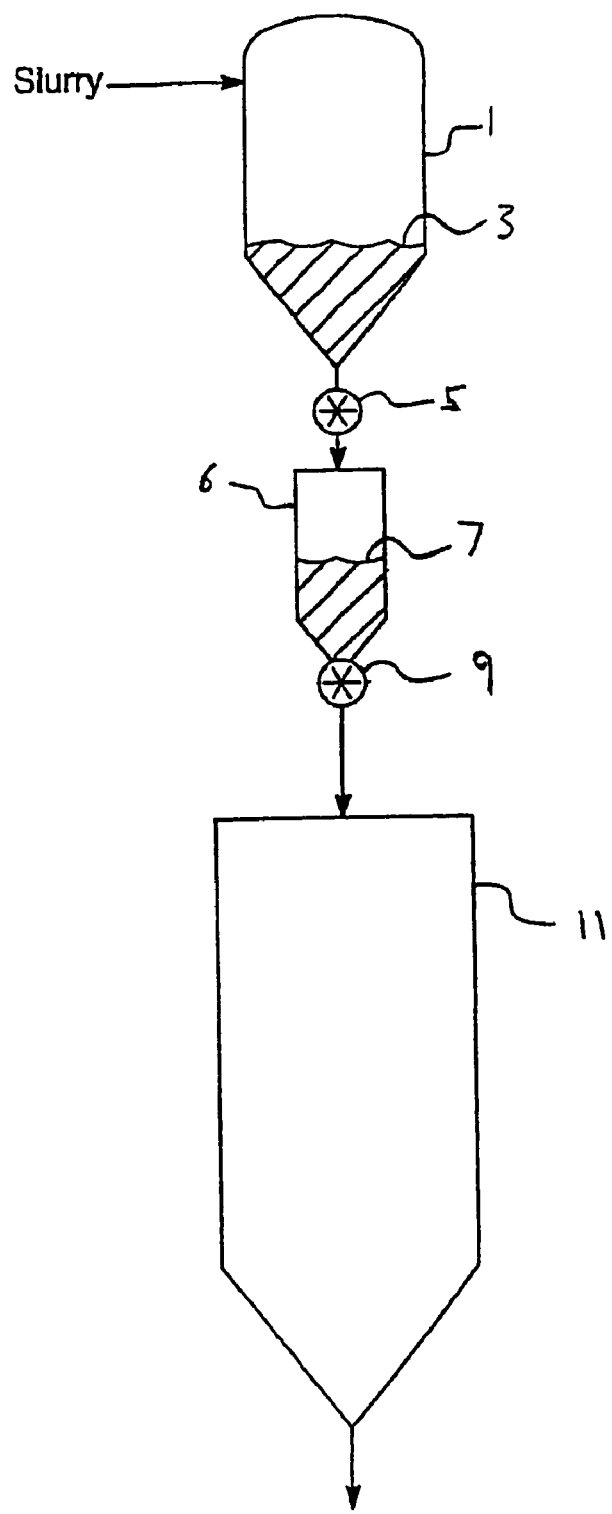
FIG. 4 shows a schematic representation of a process for recovering polymer solids form a polymerisation effluent according to the present invention.

A schematic of how an apparatus can be arranged to carry out the method according to the present invention is illustrated in FIG. 4. A polymerisation effluent (typically comprising a slurry of polymer particles, reaction diluent, and unreacted monomer) is introduced into a flash vessel 1. Following the flash process, polymer solids 3 are passed to a purge column 11 via a transfer vessel 6. The polymer solids are passed to the transfer vessel 6 through a first valve means (rotary valve 5), and are passed from the transfer vessel 6 to the purge column 11 through a second valve means (rotary valve 9). During the transfer process, the polymer solids are passed from the flash vessel 6 to the purge column 11 such that a quantity of polymer solids 7 is maintained in the transfer vessel 6.

It will be understood that by increasing the rate of transfer of polymer solids through the first valve means relative to the second valve means (for example, by increasing the rate of transfer of polymer solids through the first valve 5, or by decreasing the rate of transfer of polymer solids through the second valve 9) the quantity of polymer solids in the transfer vessel 6 will increase. Conversely, by increasing the rate of transfer of polymer solids through the second valve means relative to the first valve means (for example, by increasing the rate of transfer of polymer solids through the second valve 9, or by decreasing the rate of transfer of polymer solids through the first valve 5), the quantity of polymer solids in the transfer vessel 3 will decrease. Accordingly, a required quantity of polymer solids in the transfer vessel can be achieved by simply adjusting the flow rate through the first and second valves.

The rate of transfer of polymer particles through the first and second valve means is preferably controlled to ensure the level of polymer particles in the flash means and the transfer vessel do not build up to dangerously high levels, or do not diminish to levels which would prevent the operation of a continuous flow.

In a preferred aspect, the rate of transfer of polymer solids passing through the first valve means is substantially the same as the rate of transfer of polymer solids passing through the second valve means.

This may be achieved by measuring the level of polymer solids in the transfer vessel and comparing the measured level with a predetermined level, and if necessary, adjusting said first and/or second valve means to ensure the level of polymer solid in the transfer vessel is maintained substantially at the predetermined level.

The level of polymer solids in the transfer vessel can be measured for example by using ultrasonic or nuclear level measurements.

More generally, the rate of transfer of polymer solids through the second valve means can be made dependent on the level of polymer solids in the transfer vessel. This can be achieved, for example, by measuring the level of polymer solids in the transfer vessel, comparing this level to a predetermined level, and adjusting the second valve means accordingly. Referring to FIG. 2, this can be achieved by employing a measuring means 19 to measure the quantity of polymer solids 7 in the transfer vessel 6, and processing the measured level in processor 21 to generate a feedback signal 23 to a control means (not shown) to control the rate of transfer through the second valve 9.

The level of polymer solids in the transfer vessel can also be used to control the rate of transfer of polymer solids from the flash means to the purge means. This can be achieved, for example, by measuring the level of polymer solids in the transfer vessel, comparing this level to a predetermined level, and adjusting the first and second valve means accordingly. Referring to FIG. 1, this can be achieved by employing a measuring means 21 to measure the quantity of polymer solids 7 in the transfer vessel 6, and processing the measured level in processor 21 to generate a feedback signals 17 and 23 to first and second control means (not shown) to control the rate of transfer through the first and second valves 5, 9.

The process according to the present invention may further comprise measuring the level of polymer solids in the flash vessel and comparing the measured level with a predetermined level, and if necessary, adjusting said first valve means to ensure the level of polymer solid in the flash vessel is maintained substantially at the predetermined level.

More generally, the rate of transfer of polymer solids through the first valve means can be made dependent on the level of polymer solids in the flash vessel. This can be achieved, for example, by measuring the level of polymer solids in the flash means, comparing this level to a predetermined level, and adjusting the first valve means accordingly. Referring to FIG. 2, this can be achieved by employing a measuring means 13 to measure the quantity of polymer solids 3 in the flash vessel 1, and processing the measured level in processor 15 to generate a feedback signal 17 to a first control means (not shown) to control the rate of transfer through the first valve 5.

The level of polymer solids in the flash vessel can also be used to control the rate of transfer of polymer solids from the flash means to the purge means. This can be achieved, for example, by measuring the level of polymer solids in the transfer vessel, comparing this level to a predetermined level, and adjusting the first and/or second valve means accordingly. Referring to FIG. 3, this can be achieved by employing a measuring means 13 to measure the quantity of polymer solids 3 in the flash vessel 1, and processing the measured level in processor 15 to generate a feedback signals 17 and 23 to control means (not shown) to control the rate of transfer through the first and second valves 5, 9.

In a further aspect of the invention, the level of polymer solids in both the flash vessel and the transfer vessel can be measured and these two values can be used together to control the rate of transfer of polymer solids from the flash vessel to the purge means. This can be effected by measuring the levels of polymer solids in both the flash vessel and the transfer vessel, processing these levels in a processor and generating feedback signals to the first and second control means.

In a further embodiment of the present invention, the flash vessel operates at a first pressure, the transfer vessel operates at a second pressure, and the purge means operates at a third pressure, wherein the first pressure is higher than the second pressure, and the second pressure is higher than the third pressure. This provides a staged pressure drop between the flash vessel and the purge means and so provides a further mechanism for reducing the passage of gas/vapour from the purge means to the flash vessel.

The present invention is not particularly limited by the polymerisation process itself. Preferably, the polymer solids are formed from at least one olefin monomer. More preferably, the polymer solids are selected from polyethylene or polypropylene.

The invention claimed is:

1. A method for the recovery of a slurry of polymer solids from a polymerization reactor comprising:
   recovering a slurry comprising polymer solids in a liquid medium from a loop reactor through a settling leg via a discharge valve;
   passing the slurry from the loop reactor to a flash vessel;
   reducing a pressure of the slurry from a first pressure to a second pressure within the flash vessel to vaporize the liquid medium and form vapor;
   removing at least a portion of the vapor from the flash vessel to form a concentrated slurry;
   passing the concentrated slurry from the flash vessel to a transfer vessel;
   measuring a level of polymer solids within the flash vessel;
   continuously withdrawing an amount of polymer solids from the transfer vessel and passing the amount of polymer solids from the transfer vessel to a purge vessel, the amount adapted to maintain the level of polymer solids within the flash vessel at a predetermined level;
   removing remaining liquid from the polymer solids within the purge vessel; and
   recovering the polymer solids from the purge vessel.

2. The method of claim 1 further comprising passing a nitrogen containing gas through the purge vessel to remove accumulated liquid from the polymer slurry in the purge vessel.

3. The method of claim 1, wherein the predetermined level of polymer solids seals the flash vessel from the purge vessel.

4. The method of claim 1, wherein the polymer solids comprise an olefin polymer.

5. A system for the recovery of a polymer from a polymerization reactor comprising:
   a polymerization loop reactor adapted to contact an olefin monomer with a catalyst system to form an olefin polymer within a polymer slurry and comprising a settling leg;
   a flash vessel operably connected to the settling leg of the polymerization reactor and adapted to receive the polymer slurry and vaporize at least a portion of diluent from the polymer slurry;
   a purge vessel adapted to separate remaining diluent from the polymer slurry;
   a transfer vessel disposed between the flash vessel and the purge vessel;
   a first valve disposed between the flash vessel and the transfer vessel; and
   a second valve disposed between the transfer vessel and the purge vessel, the first and second valves adapted to maintain a predetermined level of polymer slurry within the purge vessel.

6. The system of claim 5 further comprising a control system operably connected to the first valve and the second valve and adapted to communicate with the same.

7. The system of claim 6, wherein the control system is adapted to measure a level of polymer slurry within the transfer vessel.

* * * * *